United States Patent
Sambe et al.

(10) Patent No.: US 7,949,939 B2
(45) Date of Patent: May 24, 2011

(54) DOCUMENT PROCESSING AND MANAGING SYSTEM, DOCUMENT PROCESSING-MANAGING APPARATUS, DOCUMENT PROCESSING APPARATUS, DOCUMENT PROCESSING-MANAGING METHOD, DOCUMENT PROCESSING METHOD AND COMPUTER READABLE MEDIUM

(75) Inventors: Hirofumi Sambe, Kanagawa (JP); Dainichiro Kakei, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1033 days.

(21) Appl. No.: 11/790,358

(22) Filed: Apr. 25, 2007

(65) Prior Publication Data
US 2008/0112006 A1   May 15, 2008

(30) Foreign Application Priority Data
Nov. 9, 2006   (JP) ................. 2006-303450

(51) Int. Cl.
*G06F 17/00* (2006.01)
*G06F 15/18* (2006.01)
(52) U.S. Cl. ........ 715/229; 715/234; 715/255; 715/273; 715/741; 706/26; 706/27
(58) Field of Classification Search .......... 715/200–210, 715/226, 227, 229, 231, 234, 255, 273, 700, 715/731, 741–744, 746, 760; 726/2, 4, 6, 726/17, 21, 27–29
See application file for complete search history.

(56) References Cited

U.S. PATENT DOCUMENTS

| | | | | |
|---|---|---|---|---|
| 6,085,239 | A * | 7/2000 | Kubo et al. | 709/223 |
| 6,205,478 | B1 * | 3/2001 | Sugano et al. | 709/223 |
| 6,324,518 | B1 * | 11/2001 | Katsurabayashi et al. | 705/14.47 |
| 7,275,261 | B2 * | 9/2007 | Kutaragi et al. | 726/26 |
| 7,617,301 | B2 * | 11/2009 | Kii | 709/221 |
| 2004/0254810 | A1 * | 12/2004 | Yamaga et al. | 705/1 |
| 2006/0061802 | A1 * | 3/2006 | Ogura | 358/1.15 |
| 2006/0066902 | A1 * | 3/2006 | Matsui et al. | 358/1.16 |
| 2006/0167906 | A1 * | 7/2006 | Ikeda et al. | 707/100 |
| 2006/0200867 | A1 * | 9/2006 | Yoshida | 726/27 |
| 2006/0294152 | A1 * | 12/2006 | Kawabe et al. | 707/200 |

FOREIGN PATENT DOCUMENTS

| | | |
|---|---|---|
| JP | 3090021 B2 | 7/2000 |
| JP | 2003-16057 A | 1/2003 |
| JP | 2004-5075 A | 1/2004 |
| JP | 2004-30056 A | 1/2004 |
| JP | 2004-355610 A | 12/2004 |

* cited by examiner

*Primary Examiner* — Maikhanh Nguyen
(74) *Attorney, Agent, or Firm* — Sughrue Mion, PLLC (57) ABSTRACT

A document processing and managing system is provided and includes a document processing apparatus and a document management apparatus including: an acquisition history holding unit that holds an acquisition history, the acquisition history including information for identifying a first user and information for identifying the electronic document; an information holding unit that holds utilization permission information to determine document processing allowed for the first user and for a second user; and an information providing unit that receives from the document processing apparatus the information for identifying the user and the information for the identifying the electronic document, refers to the acquisition history to decide whether the user is the first user of the electronic document, and transmits the utilization permission information to the document processing apparatus, so as to control the instructed document processing in accordance with a result of the decision and the utilization permission information.

9 Claims, 9 Drawing Sheets

UTILIZATION PERMISSION TABLE

| DOCUMENT IDENTIFICATION | FIRST USER UTILIZATION PERMISSION INFORMATION | SECOND USER UTILIZATION PERMISSION INFORMATION |
|---|---|---|
| 001 | (READ ENABLE, PRINT ENABLE, EDIT ENABLE, . . . | (READ ENABLE, PRINT DISABLE, EDIT DISABLE, . . . |
| 002 | (READ ENABLE, PRINT ENABLE, EDIT ENABLE, . . . | (READ ENABLE, PRINT DISABLE, EDIT DISABLE, . . . |

FIG. 4

STRING TABLE

| DOCUMENT ACQUISITION IDENTIFICATION | DOCUMENT IDENTIFICATION |
|---|---|
| 001 | 001 |
| 002 | 001 |
| 003 | 002 |

FIG. 5

ACQUISITION HISTORY TABLE

| DOCUMENT ACQUISITION IDENTIFICATION | USER IDENTIFICATION INFORMATION | TERMINAL IDENTIFICATION INFORMATION |
|---|---|---|
| 001 | USER 1 | PC2 |
| 002 | USER 2 | PC1 |

*FIG. 6*

UTILIZATION HISTORY TABLE

| DOCUMENT ACQUISITION IDENTIFICATION | USER IDENTIFICATION INFORMATION | TERMINAL IDENTIFICATION INFORMATION |
|---|---|---|
| 001 | USER 1 | PC2 |
| 001 | USER 3 | PC3 |

DOCUMENT PROCESSING AND MANAGING SYSTEM, DOCUMENT PROCESSING-MANAGING APPARATUS, DOCUMENT PROCESSING APPARATUS, DOCUMENT PROCESSING-MANAGING METHOD, DOCUMENT PROCESSING METHOD AND COMPUTER READABLE MEDIUM

CROSS-REFERENCE TO RELATED APPLICATION

This application is based on and claims priority under 35 USC §119 from Japanese Patent Application No. 2006-303450 filed Nov. 9, 2006.

BACKGROUND (i) Technical Field

The present invention relates to a document processing and managing system, a document processing-managing apparatus, a document processing apparatus, a document processing-managing method, a document processing method and a computer readable medium.

(ii) Related Art

An electronic document created by using a computer is distributed to each user and is utilized for reading, printing and edition. Thus, information is transmitted and shared.

Referring to the distribution of the electronic document, various techniques have been proposed.

A user to utilize a distributed electronic document through a document processing such as reading, printing or edition is divided into a first user acquiring the electronic document from a distribution source of the electronic document and a second user acquiring the electronic document through the first user (which includes a second user making an acquisition from the first user and a third user making an acquisition from the second user).

A provider of the electronic document predicts the utilization of the first user and sets a utilization permission for permitting the electronic document to be read or edited, thereby restricting a document processing which can be carried out for the electronic document. However, the provider cannot specifically grasp the second user. For this reason, it is hard to carry out a proper restriction to the second user.

In many cases, moreover, a user grasped really by the provider is the first user. In some cases, the provider wants to permit a free utilization to some degree. When the restriction for the second user which is substantially hard to manage is not carried out, however, a wrong utilization of the electronic document or an unauthorized utilization is apt to be generated However, in the case in which there is carried out a restriction for prohibiting all of document processings to be carried out by the second user, for example, a business person in charge belonging to an organization to be a distribution source of an electronic document cannot utilize the electronic document when an administrator of the organization is the first user. For this reason, in the case in which the document processing is restricted for the electronic document to be distributed, it is necessary to take the second user into consideration.

It is hard for the provider of the electronic document to previously grasp all of the second users and to distribute the electronic document. For this reason, it is possible to propose a method of causing the first user to set the utilization permission of the second user. In this method, however, the provider cannot manage the second user.

Therefore, it is desirable to employ a method of restricting the document processing of the electronic document by the second user even if the provider of the electronic document does not specifically grasp the second user. However, the technique has not been proposed yet.

SUMMARY

According to one aspect of the present invention, there is provided a document processing and managing system comprising A document processing and managing system comprising a document processing apparatus and a document management apparatus, the document processing apparatus comprising:
an information requesting unit that transmits, to the document management apparatus, information for identifying a user who instructs a document processing and information for identifying an electronic document subjected to the document processing; and
a document processing unit that carries out the document processing, the document management apparatus comprising:
an acquisition history holding unit that holds an acquisition history, the acquisition history including information for identifying a first user who acquires the electronic document from a document holding apparatus and information for identifying the electronic document;
an information holding unit that holds utilization permission information to determine document processing allowed for the first user and for a second user who acquires the electronic document through the first user, contents of the document processing allowed for the first user and for the second user being different from each other; and
an information providing unit that receives from the document processing apparatus the information for identifying the user and the information for the identifying the electronic document, refers to the acquisition history to decide whether the user is the first user of the electronic document, and transmits the utilization permission information to the document processing apparatus, so as to control the instructed document processing in accordance with a result of the decision and the utilization permission information.

BRIEF DESCRIPTION OF THE DRAWINGS

Embodiments of the present invention will be described in detail based on the following figures, wherein.

DETAILED DESCRIPTION

Specific description will be given based on exemplary embodiments of the invention.

Figure 1:
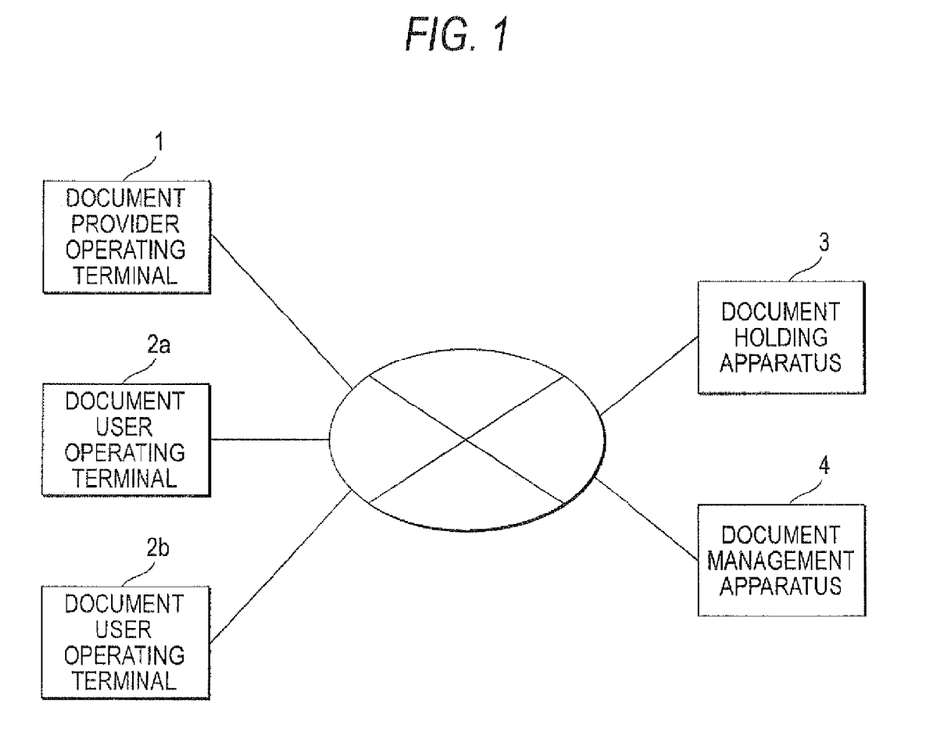
FIG. 1 is a diagram showing a summary of a document processing and managing system according to an exemplary embodiment of the invention.

A document processing and managing system according to an exemplary embodiment sets different restrictions to document processings such as display, print and edition for an electronic document depending on a first user acquiring the electronic document from a distribution source (a document holding apparatus) and a second user acquiring the electronic document through the first user (including the second user acquiring the electronic document from the first user and a third user which subsequently acquires the electronic document). As shown in FIG. 1, a document provider operating terminal 1 to be operated by a provider of the electronic document, a document user operating terminal (a document processing apparatus) 2a to be operated by the first user, a document user operating terminal (a document processing apparatus) 2b to be operated by the second user, a document holding apparatus 3 for holding the electronic document to be a distribution object, and a document management apparatus 4 for managing the document processing by the first user and the second user are connected through a network N.

FIG. 1 shows one document provider operating terminal 1, one document user operating terminal 2a, one document user operating terminal 2b, one document holding apparatus 3 and one document management apparatus 4. The numbers of them may be two or more in order to constitute the document processing and managing system.

Functional structures of the terminals and the apparatuses will be described with reference to FIG. 2.

The document provider operating terminal 1 includes a communicating portion 11 for carrying out a communication with other terminals and apparatuses through the network N, a UI (user interface) 12 for providing information to a user through a display output to a liquid crystal display and accepting an instruction input from a provider through an input device such as a keyboard or a mouse, a document registering portion 13 for transmitting an electronic document to be a distribution object to the document holding apparatus 3 and registering the electronic document, and a utilization permission information setting portion 14 for setting, to the electronic document, utilization permission information which will be described below.

The document user operating terminal 2 (2a, 2b) includes a communicating portion 21 for carrying out a communication with other terminals and apparatuses through the network N, a UI 22 for providing information to a user through a display output to a liquid crystal display and accepting an instruction input from a user through an input device such as a keyboard or a mouse, a document acquiring portion 23 for acquiring an electronic document from the document holding apparatus 3 or the other document user operating terminal 2, a utilization permission information requesting portion 24 for giving a request for utilization permission information of the electronic document to be the processing object to the document management apparatus 4, and a document processing portion 25 for carrying out a document processing such as display, print or edition for the electronic document.

The document holding apparatus 3 includes a communicating portion 31 for carrying out a communication with other terminals and apparatuses through the network N, a document holding portion 32 for holding an electronic document to be an open object, a document storing portion 33 for storing the electronic document received from the document provider operating terminal 1 in the document holding portion 32, and a document providing portion 34 for reading, from the document holding portion 32, a corresponding electronic document to a request given from the document user operating terminal 2 and returning the electronic document.

The document management apparatus 4 includes a communicating portion 41 for carrying out a communication with other terminals and apparatuses through the network N, an information holding portion 42 for holding each table which will be described below, an ID issuing portion 47 for issuing an ID for each acquisition of an electronic document held in the document holding apparatus 3 and an ID for each acquisition of the electronic document from the document holding apparatus 3, and a utilization permission information providing portion 48 for providing utilization permission information corresponding to the first user or the second user to the document user operating terminal 2.

The information holding portion 42 holds a utilization permission table 43, a string table 44, an acquisition history table 45 and a utilization history table 46.

Figure 3:
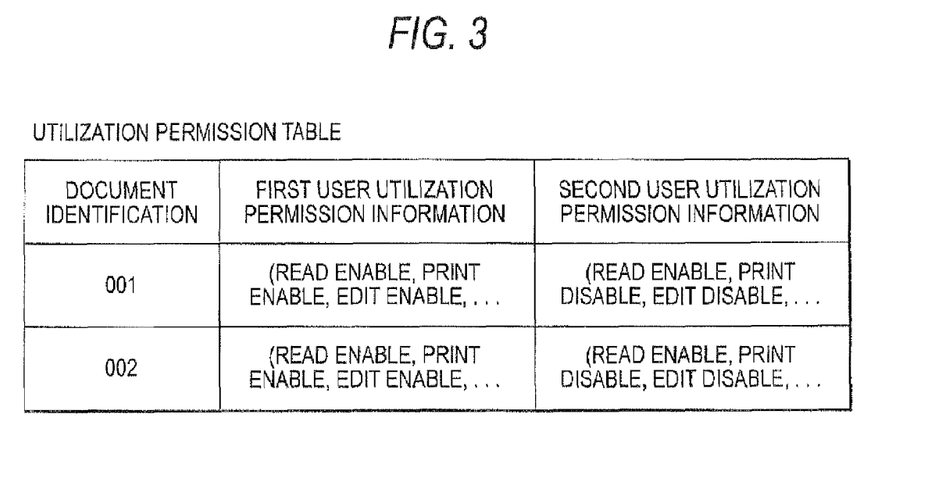
FIG. 3 is a diagram showing a data example of a utilization permission table according to the example of the invention.

As shown in FIG. 3, the utilization permission table 43 holds a set of a "document identification ID" for identifying an electronic document of a distribution object, "first user utilization permission information" to be information indicative of a document processing in which the first user for the electronic document is permitted, and "second user utilization permission information" to be information indicative of a document processing in which the second user for the electronic document is permitted. The document identification ID is issued by the ID issuing portion 47 every time the electronic document to be the distribution object is stored in the document holding portion 32. Moreover, the first user and the second user are not concretely specified but the utilization permission information is set.

Referring to FIG. 3, electronic documents corresponding to document identification IDs: 001 and 002 can be read, printed and edited by the first user but can be read and can be neither printed nor edited by the second user.

Figure 4:
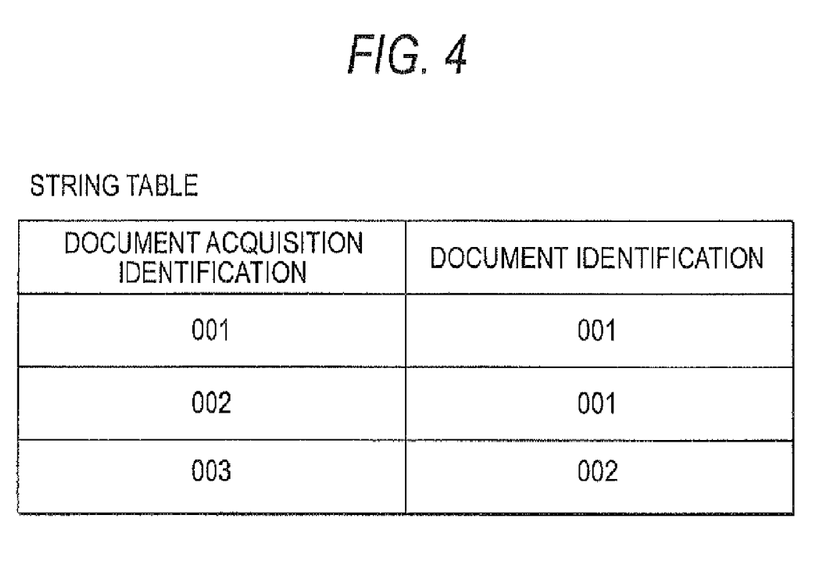
FIG. 4 is a diagram showing a data example of a string table according to an exemplary embodiment of the invention.

As shown in FIG. 4, the string table 44 holds a set of a "document acquisition identification ID" issued from the ID issuing portion 47 every acquisition of the electronic document from the document holding portion 32 and a "document identification ID" for identifying the electronic document.

Referring to FIG. 4, the electronic document corresponding to the document identification ID: 001 is acquired twice and the electronic document corresponding to the document identification ID: 002 is acquired once.

Figure 5:
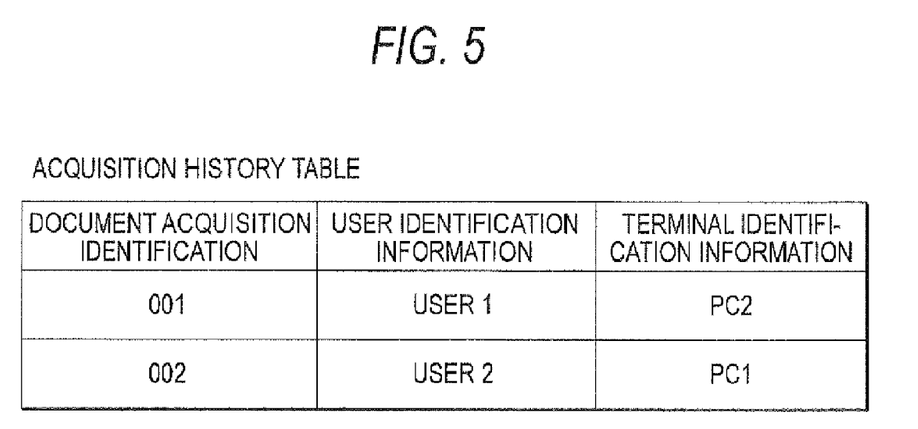
FIG. 5 is a diagram showing a data example of an acquisition history table according to an exemplary embodiment of the invention.

As shown in FIG. 5, the acquisition history table 45 holds a set of the "document acquisition identification ID" issued from the ID issuing portion 47 every acquisition of the electronic document from the document holding portion 32, "user identification information" for identifying the user (first user) acquiring the electronic document, and "terminal identification information" for identifying the document user operating terminal 2 used for the acquisition. More specifically, by specifying the document acquisition identification ID, it is possible to identify the first user acquiring the electronic document from the document holding portion 32, and furthermore, to identify the electronic document which is acquired.

Referring to FIG. 5, a User 1 (user) uses a PC2 (the document user operating terminal 2) to acquire the electronic document (document identification ID: 001) corresponding to the document acquisition identification ID: 001, and a User 2 (user) uses a PC1 (the document user operating terminal 2) to acquire the electronic document (document identification ID: 001) corresponding to the document acquisition identification ID: 002.

Figure 6:
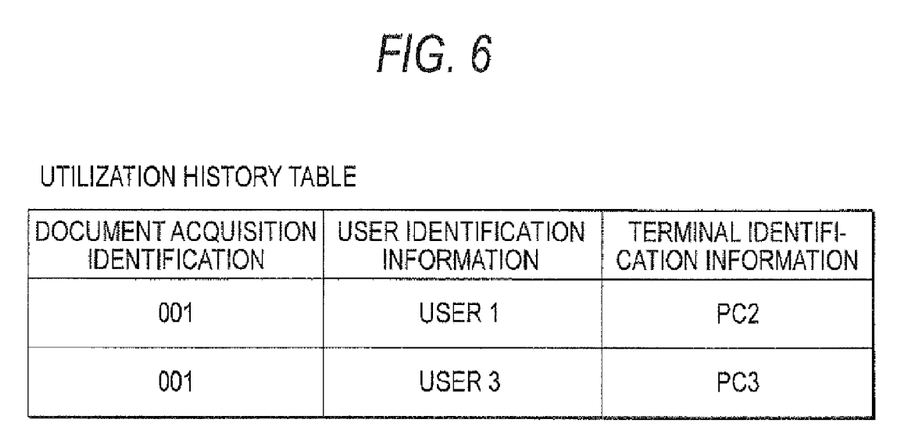
FIG. 6 is a diagram showing a data example of a utilization history table according to an exemplary embodiment of the invention.

As shown in FIG. 6, the utilization history table 46 holds a set of the "document acquisition identification ID" issued from the ID issuing portion 47 every acquisition of the electronic document from the document holding portion 32, the "user identification information" for identifying the user indicating the document processing for the electronic document, and the "terminal identification information" for identifying the document user operating terminal 2 using the document processing.

Referring to FIG. 6, the User 1 (user) uses the PC2 (the document user operating terminal 2) to indicate the document processing for the electronic document (the document identification ID: 001) corresponding to the document acquisition information ID: 001, and a User 3 (user) uses a PC3 (the document user operating terminal 2) to indicate a document processing for the electronic document (the document identification ID: 001) corresponding to the document acquisition identification ID: 001.

In place of the terminal identification information, for example, an IP address of the document user operating terminal 2 or a serial number of a document display and edit application to be operated by the document user operating terminal 2 may be used to identify the document user operating terminal 2.

The contents of the processing to be carried out by each of the functional unit will be specifically described with reference to FIGS. 7, 8 and 9.

Figure 7:
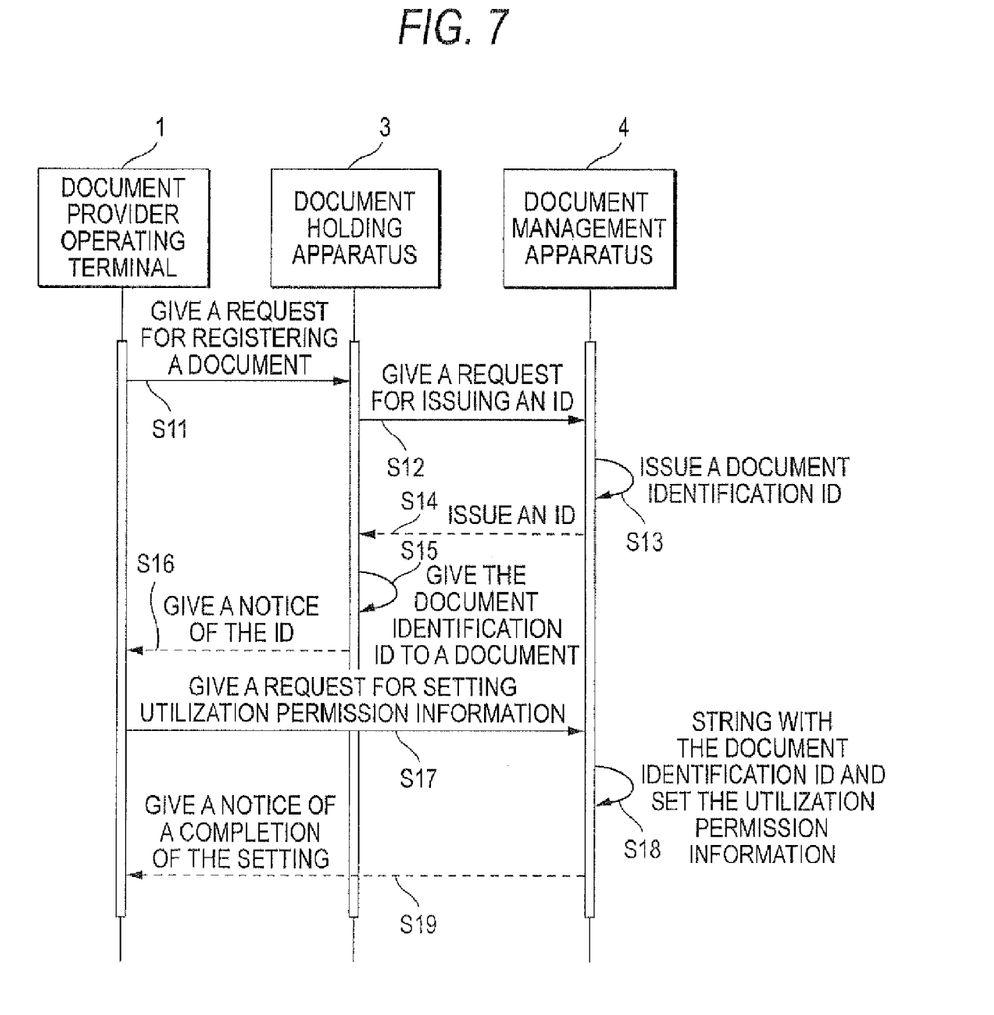
FIG. 7 is a flowchart showing a processing procedure in a registration of an electronic document to be distributed according to an exemplary embodiment of the invention.

FIG. 7 shows a processing procedure in a registration of an electronic document to be distributed.

When an instruction input for registering an electronic document to be a distribution object is accepted from a provider through the document provider operating terminal 1, the document registering portion 13 transmits the electronic document to the document holding apparatus 3 (Step S11).

When the document holding apparatus 3 receives the electronic document from the document provider operating terminal 1, the document storing portion 33 gives a request for issuing a document identification ID to the document management apparatus 4 (Step S12) and the document management apparatus 4 issues a document identification ID in response to the issuing request by the ID issuing portion 47 (Step S13) and returns the document identification ID to the document holding apparatus 3 (Step S14).

When the document holding apparatus 3 receives the document identification ID which is issued, the document storing portion 33 causes the document holding portion 32 to hold the document identification ID in association with the received electronic document (Step S15), and furthermore, gives a notice of the document identification ID to the document provider operating terminal 1 (Step S16).

The document provider operating terminal 1 accepts, from the provider, the set and input of the first user utilization permission information and the second user utilization permission information for the electronic document, the utilization permission information setting portion 14 transmits the input contents in association with the document identification ID given from the document holding apparatus 3 to the document management apparatus 4 (Step S17), the document management apparatus 4 sets, to the utilization permission table 43, the received document identification ID and the first user utilization permission information and second user utilization permission information (Step S18), and returns a set completion notice to the document provider operating terminal 1 (Step S19).

By the processing, the electronic document to be the distribution object is registered in the document holding portion 32 of the document holding apparatus 3, and furthermore, the first user utilization permission information and second user utilization permission information for the electronic document are set to the utilization permission table 43 of the document management apparatus 4.

The electronic document to be the distribution object can also be registered by other methods in addition to the method. For example, the document holding apparatus 3 receiving the electronic document from the document provider operating terminal 1 may transfer the electronic document to the document management apparatus 4, and the document management apparatus 4 may issue the document identification ID and may give the document identification ID to the electronic document, and may then return and register them into the document holding apparatus 3. For example, moreover, the document provider operating terminal 1 may give a request for issuing the document identification ID to the document management apparatus 4 and may give the issued document identification ID to the electronic document, and may then transmit and register them into the document holding apparatus 3. For example, furthermore, the document provider operating terminal 1 may transmit the electronic document to the document management apparatus 4 and the document management apparatus 4 may issue the document identification ID and may give the document identification ID to the electronic document, and may then transmit and register them through the document provider operating terminal 1 into the document holding apparatus 3 or may directly transmit and register them into the document holding apparatus 3.

Moreover, the first user utilization permission information and the second user utilization permission information can also be set by other methods in addition to the method. For example, the user utilization permission information and the second user utilization permission information for the electronic document may be transmitted and set to the document management apparatus 4 through the document holding apparatus 3. For example, furthermore, both an input of an instruction for registering the electronic document and an input of setting of the first user utilization permission information and the second user utilization permission information may be started in response to the fact that they are accepted from the provider.

Figure 8:
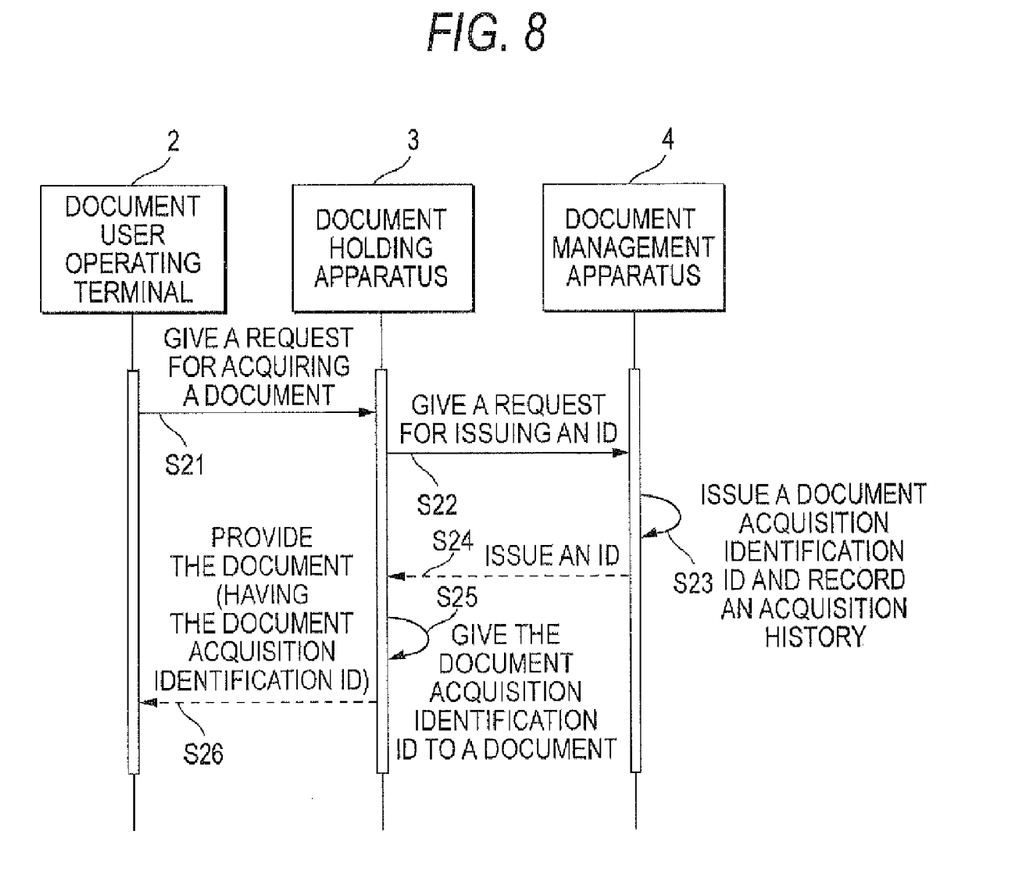
FIG. 8 is a flowchart showing a processing for causing a user to acquire an electronic document from a distribution source according to an exemplary embodiment of the invention.

FIG. 8 shows a processing procedure in which the user acquires the electronic document from the distribution source.

When an input for giving an instruction for acquiring an electronic document from a user is accepted through the document user operating terminal 2, the document acquiring portion 23 transmits, to the document holding apparatus 3, a document identification ID of the electronic document together with user identification information about the user and terminal identification information of the document user operating terminal 2, and gives a request for transmitting the electronic document (Step S21).

In the document holding apparatus 3, the document providing portion 34 transfers, to the document management apparatus 4, the document identification ID received from the document user operating terminal 2, the user identification information and the terminal identification information and gives a request for issuing a document acquisition identification ID (Step S22).

The document management apparatus 4 issues the document acquisition identification ID in response to the issued request through the ID issuing portion 47 and stores the document acquisition identification ID in association with the transferred document identification ID in the string table 44, and stores, in the acquisition history table 45, an acquisition history recording the document acquisition identification ID and the transferred user identification information and the terminal identification information (Step S23) and returns the document acquisition identification ID to the document holding apparatus 3 (Step S24).

When the document holding apparatus 3 receives the document acquisition identification ID which is issued, the document providing portion 34 reads, from the document holding portion 32, an electronic document corresponding to the received document identification ID and gives a document acquisition identification ID to the electronic document (Step S25), and transmits them to the document user operating terminal 2 (Step S26).

Figure 9:
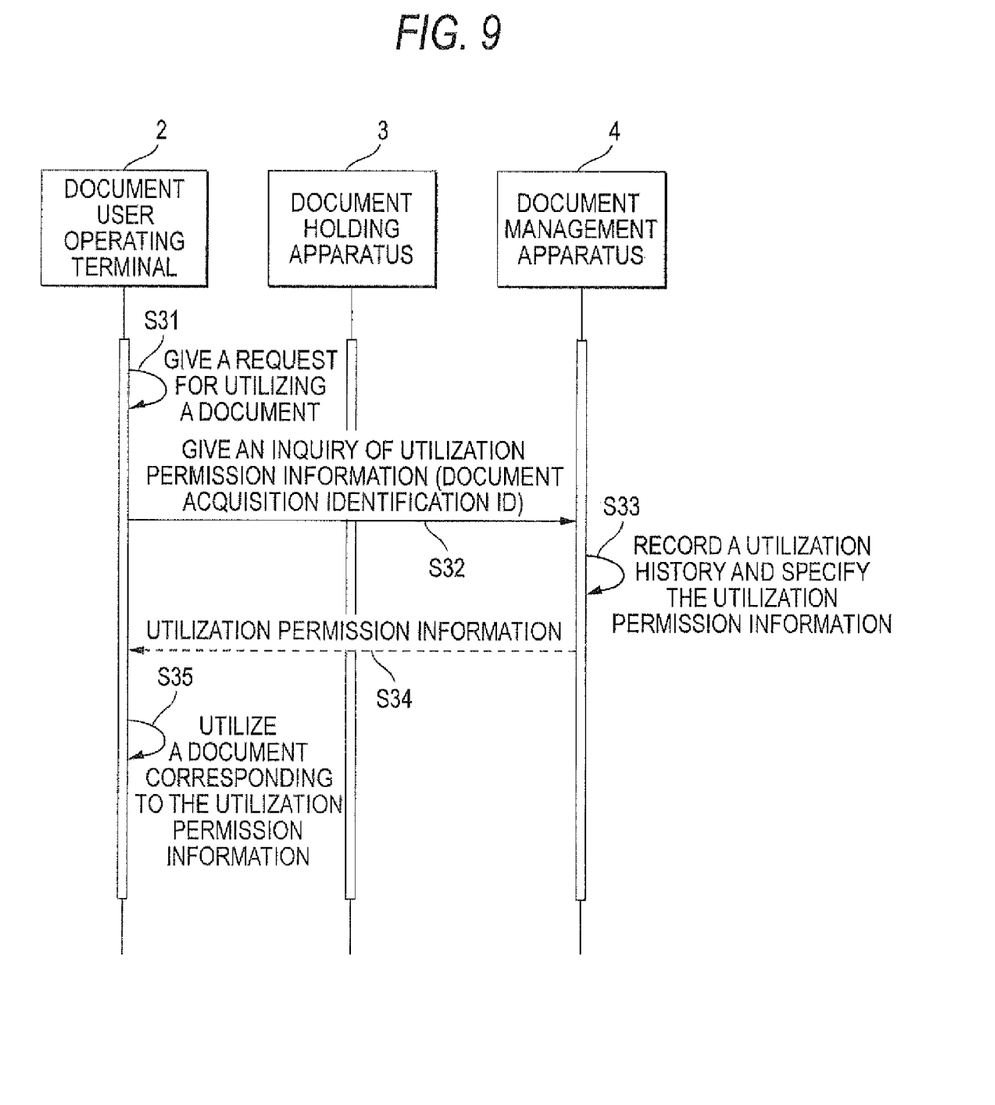
FIG. 9 is a flowchart showing a procedure for causing a user to carry out a document processing over an electronic document according to an exemplary embodiment of the invention.

FIG. 9 shows a processing procedure in which the user carries out a document processing over the electronic document.

When an input for giving an instruction for a document processing for the electronic document is accepted from the user through the document user operating terminal 2 (Step S31), the utilization permission information requesting portion 24 transmits, to the document management apparatus 4, the document acquisition identification ID given to the electronic document together with the user identification information about the user and the terminal identification information of the document user operating terminal 2 and gives a request for transmitting the utilization permission information (Step S32).

The document management apparatus 4 stores, in the utilization history table 46, a utilization history recording the document acquisition identification ID received from the document user operating terminal 2, the user identification information and the terminal identification information, and the utilization permission information providing portion 48 checks the presence of an acquisition history having the same recorded contents as the utilization history in the acquisition history table 45. If the acquisition history is present, it is decided that the user corresponding to the user identification information is the first user. If the acquisition history is not present, it is decided that the user is the second user. The first user utilization permission information or the second user utilization permission information in association with the document identification ID which is equivalent to the document acquisition identification ID is specified from the utilization permission setting table 43 depending on the result of the decision (Step S33), and is transmitted to the document user operating terminal 2 (Step S34).

Upon receipt of the first user utilization permission information or the second user utilization permission information, the document user operating terminal 2 carries out a document processing for the electronic document indicated to the user based on the first user utilization permission information or the second user utilization permission information which is received (Step S35).

In the case in which the user acquiring the electronic document from the distribution source inputs the instruction for the document processing, an acquisition history having the same recorded contents as the utilization history related to the document processing is present. Therefore, it is decided that the user is the first user, and the first user utilization permission information is transmitted. Accordingly, in the case in which an instruction for carrying out a document processing over the electronic document having the document identification ID: 001 is input, for example, it is possible to execute all of reading, printing and editing processings.

On the other hand, in the case in which another user acquiring the electronic document from the first user inputs the instruction for the document processing, the acquisition history having the same recorded contents as the utilization history related to the document processing is not present. Therefore, it is decided that the user is the second user, and the second user utilization permission information is transmitted. Accordingly, in the case in which the instruction for carrying out the document processing over the electronic document having the document identification ID: 001 is input, for example, the reading processing can be performed but the printing and editing processings cannot be executed.

In the embodiment, the user identification information and the terminal identification information are recorded in the utilization history and the acquisition history. In the case in which the user acquiring the electronic document and the document user operating terminal 2 are coincident with the user giving the instruction for the document processing over the electronic document and the document user operating terminal 2, therefore, it is decided that the user is the first user. In the case in which either the user or the document user operating terminal 2 is coincident, it may be decided that the user is the first user. Moreover, it is also possible to set the utilization permission information by making a division into the case in which both the user and the document user operating terminal 2 are coincident, the case in which the user is coincident, or the case in which the document user operating terminal 2 is coincident.

While the utilization permission information is requested every time the instruction for the document processing is input from the user in the embodiment, it is also possible to request and acquire the utilization permission information in advance.

Figure 2:
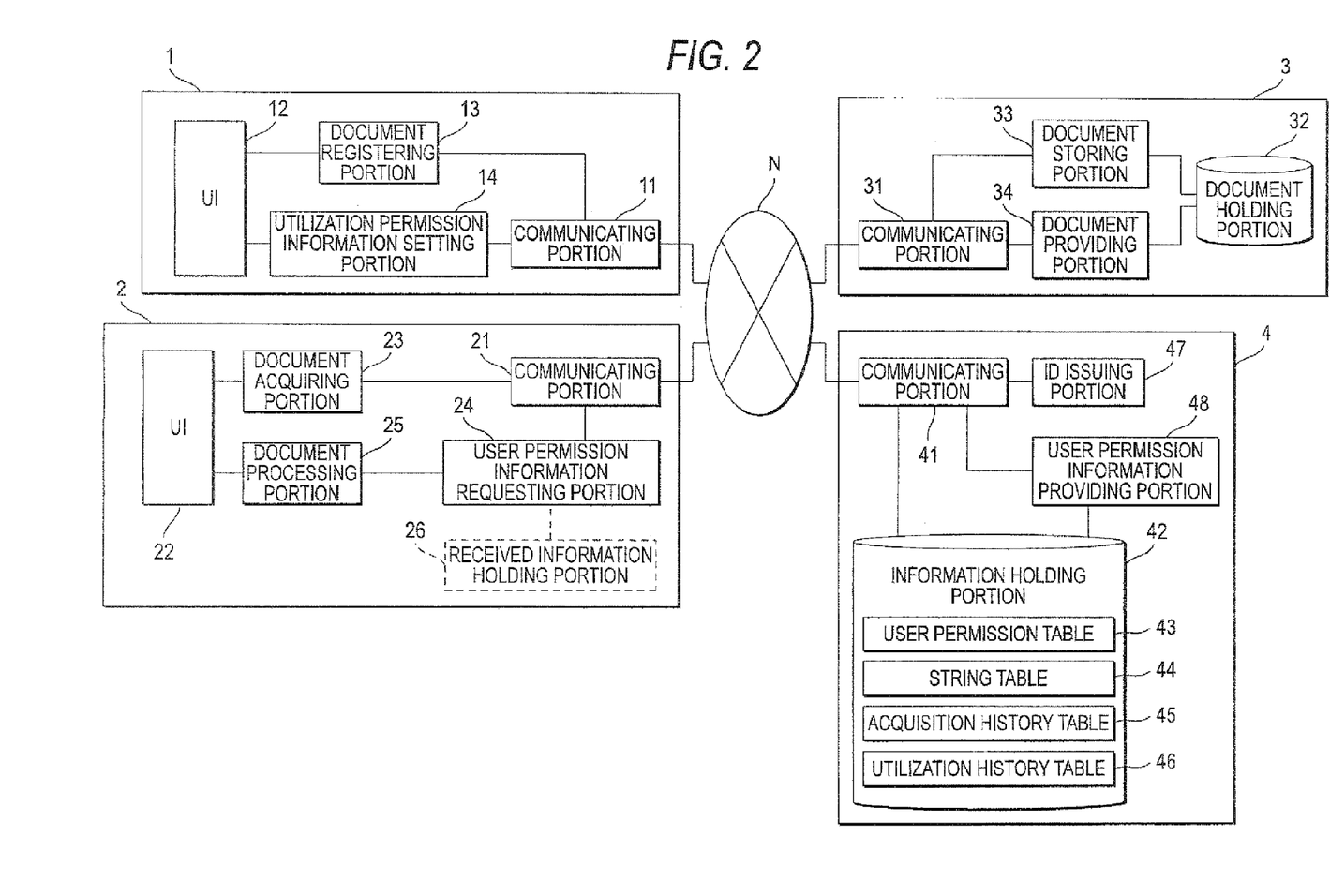
FIG. 2 is a diagram showing a functional structure of a terminal and an apparatus which are provided in a document processing and managing system according to an exemplary embodiment of the invention.

In this case, for example, it is preferable that a received information holding portion 26 shown in a broken line of FIG. 2 should be provided in the document user operating terminal 2 and the utilization permission information which is received should be held in the received information holding portion 26, and the document processing portion 25 should carry out the document processing based on the utilization permission information held in the received information holding portion 26 when the document processing is to be executed.

In the embodiment, the user capable of acquiring the electronic document is previously set and managed in the document holding apparatus 2 and a person which may be the first user is also managed by the same management. Therefore, the document management apparatus 4 does not need to manage the first user so that the user management can be set simply.

There is no restriction to the configuration in which the electronic document to be the distribution object is once registered in the document holding apparatus 2 and the electronic document is acquired from the document holding apparatus 2 as in the embodiment. For example, it is also possible to employ a configuration in which the provider provides the electronic document to the first user through an electronic mail, for example. It is sufficient that identification information about the electronic document distributed in that case and identification information about the first user to be a distribution destination are provided to the document management apparatus 4 and they can be recorded as an acquisition history in the document management apparatus 4.

Moreover, there is no restriction to the configuration in which the identification information about the electronic document which is distributed and the identification information about the first user to be the distribution destination are strung through the document acquisition identification ID, the document acquisition identification ID is attached to the electronic document and they are provided to the first user and are used for the request for the utilization permission information as in the embodiment. For example, it is also possible to implement the invention by a configuration in which the identification information about the electronic document is attached to the electronic document and is thus provided to the first user, and is used for the request for the utilization permission information.

The document user operating terminal 2 according to the embodiment has hardware resources such as a medium access portion for giving a data access to an external storage medium, an HDD (Hard Disk Drive), an RAM (Random Access Memory) and a CPU (Central Processing Unit) and constitutes the document processing portion 25 and the utilization permission information requesting portion 26 by reading a document processing program according to the invention from the storage medium or the HDD which stores and holds the program and expanding the program over the RAM, and causing the CPU to carry out a calculation processing. However, they may be constituted by a dedicated electronic circuit.

The document management apparatus 4 according to the embodiment has hardware resources such as a medium access portion for giving a data access to an external storage medium, an HDD, an RAM and a CPU and constitutes the utilization permission information providing portion 48 by reading a document processing managing program according to the invention from the storage medium or the HDD which stores and holds the program and expanding the program over the RAM, and causing the CPU to carry out a calculation processing. However, it may be constituted by a dedicated electronic circuit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing and managing system comprising a document processing apparatus and a document management apparatus,
   the document processing apparatus comprising:
      a processor that controls operations of the document processing apparatus; and
      an information requesting unit that transmits, to the document management apparatus, instructing user identification information that identifies a user who instructs the document processing apparatus to perform document processing and electronic document identification information that identifies an electronic document to be subjected to the document processing;
      wherein the processor carries out the document processing, and
   the document management apparatus comprising:
      an acquisition history holding unit that holds an acquisition history, the acquisition history including user identification information that identifies a first user who acquires the electronic document from a document holding apparatus and the electronic document identification information;
      an information holding unit that holds first user utilization permission information that indicates document processing of the electronic document that is allowed for the first user and second user utilization permission information that indicates document processing of the electronic document that is allowed for a second user who acquires the electronic document through the first user, the document processing of the electronic document that is allowed for the first user and the document processing of the electronic document that is allowed for the second user being different from each other; and
      a processor that receives from the document processing apparatus the instructing user identification information and the electronic document identification information determines from the acquisition history whether the user is the first user, transmits the first user utilization permission information to the document processing apparatus in response to determining that the user is the first user, and transmits the second user utilization permission information to the document processing apparatus in response to determining that the user is not the first user,
      wherein upon receipt of the first user utilization permission information or the second user utilization permission information, the document processing apparatus carries out the document processing for the electronic document indicated to the user based on the first user utilization permission information or the second user utilization permission information which is received.

2. The document processing and managing system according to claim 1, wherein the document processing apparatus further comprises an information holding unit that receives, from the document management apparatus, one of the first user utilization permission information and the second user utilization permission information and holds the received one of the first user utilization permission information and the second user utilization permission information, and
   the processor of the document processing apparatus controls the document processing apparatus to perform the instructed document processing based on the one of the first user utilization permission information and the second user utilization permission information held in the information holding unit.

3. The document processing and managing system according to claim 1, wherein the information requesting unit transmits, to the document management apparatus, the instructing user identification information and the electronic document identification information for every document processing instruction given from the user,
   the information providing unit transmits the one of the first user utilization permission information and the second user utilization permission information to the document processing apparatus in a response to the transmission by the information requesting unit, and
   the processor of the document processing apparatus controls the instructed document processing based on the received one of the first user utilization permission information and the second user utilization permission information.

4. The document processing and managing system according to claim 1, wherein the information holding unit holds the first and second user utilization permission information on a document processing of the electronic document in association with the electronic document identification information, and the document management apparatus transmits, to the document processing apparatus, one of the first and second user utilization permission information associated with the electronic document identification information received from the document processing apparatus.

5. The document processing and managing system according to claim 1, wherein the document management apparatus comprises a utilization history-holding unit that holds a utilization history, the utilization history having information for identifying the user and information for identifying the electronic document which are received from the document processing apparatus.

6. The document processing and managing system according to claim 5, wherein the electronic document includes information for identifying the first user of the electronic document, the information requesting unit transmits, to the document management apparatus, the information for identifying the first user included in the electronic document, and the utilization history holding unit holds one of the first and second utilization information having the information for identifying the first user received from the document processing apparatus.

7. A document management apparatus comprising:

an acquisition history holding unit that holds an acquisition history, the acquisition history including user identification information that identifies a first user who acquires an electronic document from a document holding apparatus and electronic document identification information that identifies the electronic document;

an information holding unit that holds first user utilization permission information that indicates document processing of the electronic document that is allowed for the first user and second user utilization permission information that indicates document processing of the electronic document that is allowed for a second user who acquires the electronic document through the first user, the document processing of the electronic document that is allowed for the first user and the document processing of the electronic document that is allowed for the second user being different from each other; and a processor that receives from a document processing apparatus instructing user identification information that identifies a user who instructs the document processing apparatus to perform document processing on the electronic document and the electronic document identification information to be subjected to the processing, determines from the acquisition history whether the user is the first user, transmits the first user utilization permission information to the document processing apparatus in response to determining that the user is the first user, and transmits the second user utilization permission information to the document processing apparatus in response to determining that the user is not the first user, wherein upon receipt of the first user utilization permission information or the second user utilization permission information, the document processing apparatus carries out the document processing for the electronic document indicated to the user based on the first user utilization permission information or the second user utilization permission information which is received.

8. A method of managing document processing by a document management apparatus, the method comprising:

storing an acquisition history of an electronic document, the acquisition history including user identification information that identifies a first user who acquires an electronic document from a document holding apparatus and electronic document identification information that identifies the electronic document;

storing first user utilization permission information that indicates document processing of the electronic document that is allowed for the first user and second user utilization permission information that indicates document processing of the electronic document that is allowed for a second user who acquires the electronic document through the first user, the document processing of the electronic document that is allowed for the first user and the document processing of the electronic document that is allowed for the second user being different from each other;

determining whether a user who instructs a document processing apparatus to perform document processing of an electronic document is the first user who based on instructing user identification information that identifies the user and electronic document identification information that identifies the electronic document; and transmitting, to the document processing apparatus, the first user utilization permission information in response to determining that the user is the first user, and transmitting the second user utilization permission information to the document processing apparatus in response to determining that the user is not the first user, wherein upon receipt of the first user utilization permission information or the second user utilization permission information, the document processing apparatus carries out the document processing for the electronic document indicated to the user based on the first user utilization permission information or the second user utilization permission information which is received.

9. A non-transitory computer readable storage medium storing a program causing a computer to execute a process of managing a document processing by a document management apparatus, the process comprising:

storing an acquisition history of an electronic document, the acquisition history including user identification information that identifies a first user who acquires an electronic document from a document holding apparatus and electronic document identification information that identifies the electronic document;

storing first user utilization permission information that indicates document processing of the electronic document that is allowed for the first user and second user utilization permission information that indicates document processing of the electronic document that is allowed for a second user who acquires the electronic document through the first user, the document processing of the electronic document that is allowed for the first user and the document processing of the electronic document that is allowed for the second user being different from each other;

determining whether a user who instructs a document processing apparatus to perform document processing of an electronic document is the first user based on instructing user identification information that identifies the user and electronic document identification information that identifies the electronic document; and transmitting, to the document processing apparatus, the first user utilization permission information in response to determining that the user is the first user, and transmitting the second user utilization permission information to the document processing apparatus in response to determining that the user is not the first user, wherein upon receipt of the first user utilization permission information or the second user utilization permission information, the document processing apparatus carries out the document processing for the electronic document indicated to the user based on the first user utilization permission information or the second user utilization permission information which is received.

* * * * *